US012675399B2

(12) United States Patent
Jung et al.

(10) Patent No.: US 12,675,399 B2
(45) Date of Patent: Jul. 7, 2026

(54) MEMORY CONTROLLER FOR SCHEDULING COMMANDS, STORAGE DEVICE INCLUDING MEMORY CONTROLLER, AND OPERATING METHOD OF MEMORY CONTROLLER

(71) Applicant: SAMSUNG ELECTRONICS CO., LTD., Suwon-si (KR)

(72) Inventors: Kwansuk Jung, Suwon-si (KR); Hoyoung Chang, Suwon-si (KR); Hyuntae Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/897,883

(22) Filed: Sep. 26, 2024

(65) Prior Publication Data

US 2025/0173260 A1     May 29, 2025

(30) Foreign Application Priority Data

Nov. 23, 2023   (KR) ........................ 10-2023-0164848

(51) Int. Cl.
*G06F 3/06*       (2006.01)
*G06F 12/02*      (2006.01)

(52) U.S. Cl.
CPC ................................ *G06F 12/0246* (2013.01)

(58) Field of Classification Search
CPC ...... G06F 3/0604; G06F 3/061; G06F 3/0625; G06F 3/064; G06F 3/0656; G06F 3/0658; G06F 3/0659; G06F 3/0679; G06F 12/0246; G06F 2212/1016; G06F 2212/1028
See application file for complete search history.

(56) References Cited

U.S. PATENT DOCUMENTS

| | | |
|---|---|---|
| 11,681,614 B1 | 6/2023 | Kuzmin et al. |
| 2012/0084484 A1* | 4/2012 | Post .................... G06F 12/0246 |
| | | 710/308 |
| 2016/0188206 A1* | 6/2016 | Sinclair ................ G06F 3/0659 |
| | | 711/103 |
| 2017/0084344 A1 | 3/2017 | Choi et al. |
| 2018/0157415 A1 | 6/2018 | Choi et al. |
| 2018/0173460 A1 | 6/2018 | Bandic et al. |
| 2018/0335978 A1* | 11/2018 | Tidwell .................... G06F 1/28 |
| 2021/0233593 A1 | 7/2021 | Palmer |
| 2021/0294407 A1 | 9/2021 | Yu et al. |
| 2022/0129310 A1 | 4/2022 | Kim |
| 2022/0147247 A1* | 5/2022 | Ammari ................. G06F 3/064 |
| 2022/0147480 A1 | 5/2022 | Guo |
| 2022/0188033 A1 | 6/2022 | Cho et al. |
| 2022/0342823 A1 | 10/2022 | D'Eliseo et al. |
| 2022/0382467 A1 | 12/2022 | Zhu et al. |

OTHER PUBLICATIONS

Extended European Search Report in European Appln. No. 24209506.5, mailed on Mar. 26, 2025, 11 pages.

* cited by examiner

*Primary Examiner* — Larry T Mackall
(74) *Attorney, Agent, or Firm* — Fish & Richardson P.C.

(57) ABSTRACT

A storage device includes a memory device including a plurality of dies and a memory controller receiving at least one command from a host and transferring the at least one command to the memory device, wherein the memory controller stores commands received from the host in a queue, and when there are commands that occupy the same die among the commands stored in the queue, the memory controller changes an order in which the commands are transferred to the memory device.

17 Claims, 14 Drawing Sheets

FIG. 6

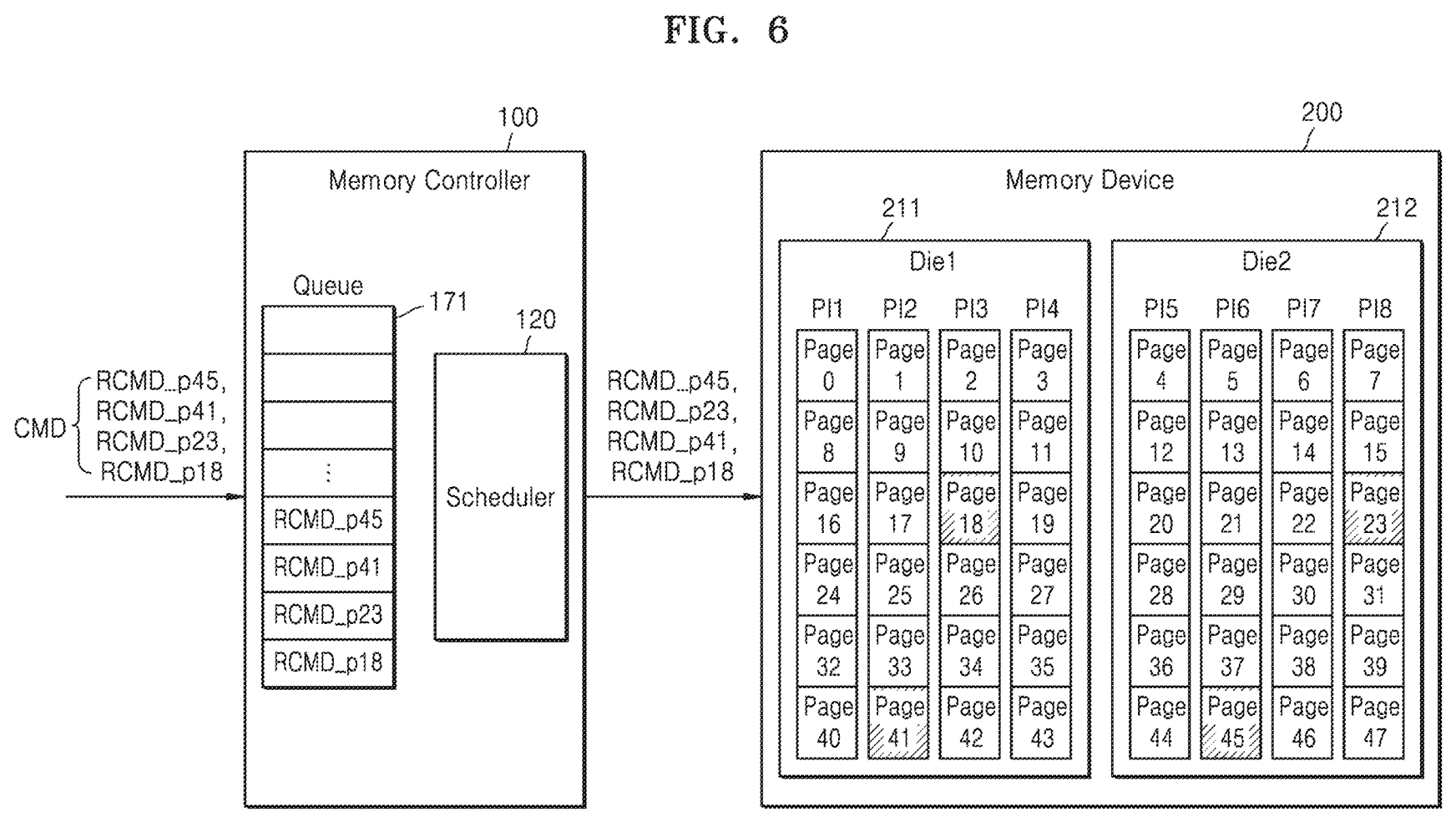

Memory Device 200

Die1 211

| PI1 | PI2 | PI3 | PI4 |
|---|---|---|---|
| Page 0 | Page 1 | Page 2 | Page 3 |
| Page 8 | Page 9 | Page 10 | Page 11 |
| Page 16 | Page 17 | Page 18 | Page 19 |
| Page 24 | Page 25 | Page 26 | Page 27 |
| Page 32 | Page 33 | Page 34 | Page 35 |
| Page 40 | Page 41 | Page 42 | Page 43 |

Die2 212

| PI5 | PI6 | PI7 | PI8 |
|---|---|---|---|
| Page 4 | Page 5 | Page 6 | Page 7 |
| Page 12 | Page 13 | Page 14 | Page 15 |
| Page 20 | Page 21 | Page 22 | Page 23 |
| Page 28 | Page 29 | Page 30 | Page 31 |
| Page 36 | Page 37 | Page 38 | Page 39 |
| Page 44 | Page 45 | Page 46 | Page 47 |

RCMD_p45,
RCMD_p23,
RCMD_p41,
RCMD_p18

Memory Controller 100

Queue 171

| |
|---|
| : |
| RCMD_p45 |
| RCMD_p41 |
| RCMD_p23 |
| RCMD_p18 |

Scheduler 120

RCMD_p45,
RCMD_p41,
RCMD_p23,
RCMD_p18

CMD

FIG. 7

MEMORY CONTROLLER FOR SCHEDULING COMMANDS, STORAGE DEVICE INCLUDING MEMORY CONTROLLER, AND OPERATING METHOD OF MEMORY CONTROLLER

CROSS-REFERENCE TO RELATED APPLICATION

This application claims priority under 35 USC § 119 to Korean Patent Application No. 10-2023-0164848, filed on Nov. 23, 2023, in the Korean Intellectual Property Office, the disclosure of which is incorporated by reference herein in its entirety.

BACKGROUND

The present disclosure relates to a storage device, and more particularly, to a storage device in which power consumption is reduced by controlling the order of commands transferred to a memory device, thereby achieving improved performance.

Storage devices, such as solid state drive (SSD), nonvolatile memory express (NVMe), embedded multi-media card (eMMC), and UFS, are widely used.

SUMMARY

Storage devices may transfer commands received from a host device to a memory device. Storage devices may generate a scheduling program to schedule commands. However, peak power issues can occur when nonvolatile memory devices are used in mobile devices, such as cell phones.

The present disclosure provides a storage device having improved performance by controlling the order of transferring commands to a memory device based on whether there are commands that occupy the same die, among at least one command stored in a queue, and a memory controller of the storage device. The disclosed scheduling program can satisfy power constraints and improve the performance of storage devices.

In general, in some aspects, a storage device that communicates with a host including a memory device includes: a plurality of dies and a memory controller configured to receive at least one command from the host and transfer the at least one command to the memory device, wherein the memory controller stores commands received from the host in a queue, and when there are commands that occupy the same die among the commands stored in the queue, the memory controller changes an order in which the commands are transferred to the memory device.

In general, in some other aspects, a memory controller includes: a queue controller configured to determine whether to store a command received from a host in a queue based on a queue depth, a scheduler configured to generate a scheduling program for providing commands to a memory device including a plurality of dies, based on whether there is an overlapping die among the plurality of dies respectively occupied by the commands stored in the queue and whether the commands are stored in the queue, and a power counter configured to compare a total amount of power of the memory device with a limited power amount of the memory device and generate a power comparison result, wherein the scheduler transfers at least one of the commands to the memory device according to the scheduling program based on the power comparison result.

In general, in some other aspects, an operating method of a memory controller includes: receiving at least one command from a host, determining whether to store the at least one command in a queue, generating a scheduling program for providing the commands to a memory device, based on whether commands are stored in the queue and whether there is an overlapping die among a plurality of dies respectively occupied by the commands stored in the queue, and transferring at least one of the commands to the memory device according to the scheduling program.

BRIEF DESCRIPTION OF THE DRAWINGS

FIG. 6 is a diagram illustrating an example of an operation of a scheduler.

FIG. 7 is a diagram illustrating an example of an operation of a scheduler according to command types.

Like reference numerals are used for the like components in the drawings, and redundant descriptions thereof are omitted.

DETAILED DESCRIPTION

Figure 1:
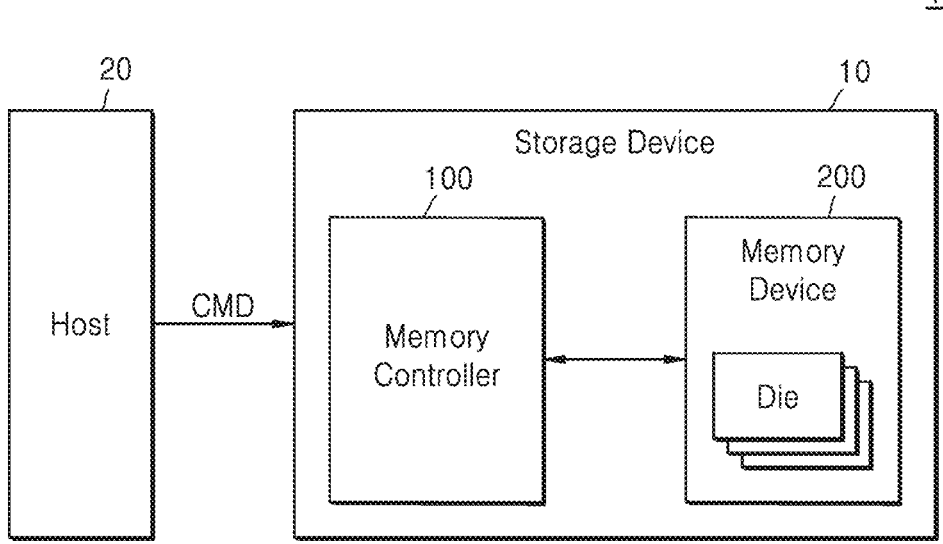
FIG. 1 is a block diagram illustrating an example of a host-storage system.

FIG. 1 is a block diagram illustrating an example of a host-storage system 1.

Referring to FIG. 1, the host-storage system 1 includes a host 20 and a storage device 10. In addition, the storage device 10 includes a memory controller 100 and a memory device 200.

The host 20 may transmit, to the storage device 10, various types of commands CMD corresponding to user requests. Accordingly, the storage device 10 may perform operations corresponding to the commands CMD. In addition, in this specification, command may be used to mean a work request or instruction.

The storage device 10 may communicate with the host 20. The storage device 10 may communicate with the host 20 through various interfaces. As an example, the storage device 10 may communicate with the host 20 through various interfaces, such as universal serial bus (USB), multimedia card (MMC), eMMC, peripheral component interconnection (PCI), PCI-express (PCI-E), and advanced technology attachment (ATA), serial-ATA, parallel-ATA, small computer small interface (SCSI), enhanced small disk interface (ESDI), integrated drive electronics (IDE), Firewire, universal flash storage (UFS), NVMe.

The storage device 10 may include a nonvolatile memory device, such as flash memory. In some implementations, the storage device 10 may be implemented as a memory built into or removable from an electronic device. For example, the storage device 10 may be implemented in various forms, such as an embedded UFS memory device, an eMMC, a solid state drive (SSD), a UFS memory card, a compact flash (CF) card, a secure digital (SD) card, a micro-SD card, a mini-SD card, an extreme digital (xD) card, a memory stick, etc.

The memory controller 100 may control the overall operation of the storage device 10. The memory controller 100 may also be referred to as a controller, a device controller, or a storage controller.

When power is applied to the storage device 10 from the outside, the memory controller 100 may execute firmware. When the memory device 200 is a flash memory device, the firmware may include a host interface layer (HIL), a flash translation layer (FTL), and a flash interface layer (FIL).

The memory controller 100 may control the memory device 200 to perform a memory operation (e.g., a program operation, a write operation, etc.) in response to a command CMD of the host 20. The memory controller 100 may receive a command CMD from the host 20 and provide the command CMD to the memory device 200. During a write operation, the memory controller 100 may provide a write command (or a program command), a physical address, and data to the memory device 200. During a read operation, the memory controller 100 may provide a read command and a physical address to the memory device 200.

As an example, the memory controller 100 may transmit a command, an address, and data generated by the memory controller 100 to the memory device 200, regardless of the command CMD provided from the host 20. For example, the memory controller 100 may generate a command, an address, and data for performing a background operation and provide the command, address, and data to the memory device 200. The background operation may be, for example, wear leveling, read reclaim, or garbage collection.

The memory controller 100 may receive at least one command CMD from the host 20 and transfer the at least one command CMD to the memory device 200. Transferring by the memory controller 100 the command CMD to the memory device 200 may include transferring a request or command generated by the memory controller 100 corresponding to the command CMD.

The memory controller 100 may store the command CMD received from the host 20 in a queue. As an example, the memory controller 100 may store a plurality of commands CMD in the queue. The queue may temporarily store the commands CMD received from the host 20. As an example, the queue may be a command queue. The memory controller 100 may transmit the commands CMD stored in the queue to a die of the memory device 200. The memory controller 100 may generate a scheduling program to transmit the command CMD to the memory device 200 and transfer the commands CMD to dies corresponding to the commands CMD, respectively, according to the generated scheduling program.

In some implementations, the memory controller 100 may control the order of transferring the commands CMD to the memory device 200, based on whether there are commands CMD that occupy the same die, among the commands CMD stored in the queue. That is, the memory controller 100 may generate a scheduling program for providing the commands CMD to the memory device 200, based on whether there are commands that occupy the same die, among the commands CMD stored in the queue. The memory device 200 may rearrange the order in which the commands CMD are transferred, based on whether there are commands CMD that occupy the same die. For the purposes of this disclosure, a command that occupies a die is understood to mean a command to be performed for the die.

The die occupied by the command CMD may refer to a die of the memory device 200 on which the command CMD is to perform a memory operation. The memory controller 100 may determine the die occupied by the command CMD through command CMD information. As an example, the memory controller 100 may determine the die occupied by each command CMD based on a logical page number (LPN) of each command CMD.

The commands CMD that occupy the same die, among the commands CMD, may refer to commands CMD that occupy overlapping dies among the dies of the memory device 200 respectively occupied by the commands CMD stored in the queue. As an example, a first read command, a second read command, and a third read command are stored in the queue, the first read command occupies a first die, the second read command occupies a second die, and a third read command occupies a first die. The first read command and the third read command may be commands CMD that occupy the same first die.

In some implementations, when there are commands CMD that occupy the same die among the plurality of commands CMD stored in the queue, the memory controller 100 may change the order in which the commands CMD are transferred to the memory device 200 so that the commands CMD that occupy the same die are in consecutive order. When there are commands CMD that occupy the same die among the commands CMD stored in the queue but not all the commands CMD stored in the queue occupy the same die, the memory controller 100 may generate a scheduling program so that the commands CMD that occupy the same die are in consecutive order.

As an example, a first read command, a second read command, and a third read command are stored in the queue, the first read command occupies the first die, the second read command occupies the second die, and the third read command occupies the first die. The memory controller 100 may generate a scheduling program so that the first read command and the third read command are in consecutive order. The memory controller 100 may transfer the first read command, the third read command, and the second read command to the memory device 200 in that order.

In some implementations, the memory device 200 may be a nonvolatile memory device. For example, the nonvolatile memory device may include a NAND flash memory device. When the memory device 200 includes flash memory, the flash memory may include a 2D NAND memory array or a 3D (or vertical) NAND (VNAND) memory array. The 3D memory array may be a circuit related to an operation of arrays of memory cells having an active region disposed on a silicon substrate or the memory cells and is formed as a monolith on the substrate or on at least one physical level of a circuit formed in the substrate. The term "monolith" refers to that layers of each level constituting the array are stacked directly on top of the layers of each lower level of the array.

In some implementations, the 3D memory array may include vertical NAND strings arranged in a vertical direction such that at least one memory cell is located on top of another memory cell. The at least one memory cell may include a charge trap layer.

However, the present disclosure is not limited thereto, and the memory device 200 may include other types of memories. For example, the memory device 200 may include a nonvolatile memory, and the nonvolatile memory may include various types of memories, such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronics memory, or insulation resistance change memory. Hereinafter, the memory device 200 is assumed to be a NAND flash memory device.

In some implementations, the memory device 200 may include a plurality of dies (e.g., a first die 211 and a second die 212 in FIG. 3), and each die may include a plurality of planes. Each plane may include a plurality of memory blocks (a memory block may also be referred to as a block). Each of the memory blocks may include a plurality of pages, and each of the plurality of pages may include a plurality of memory cells sharing one word line. As an example, a block may be an erase unit, and a page may be a write and read unit. A structure of the memory device 200 is described in detail below with reference to FIG. 3.

Figure 2:
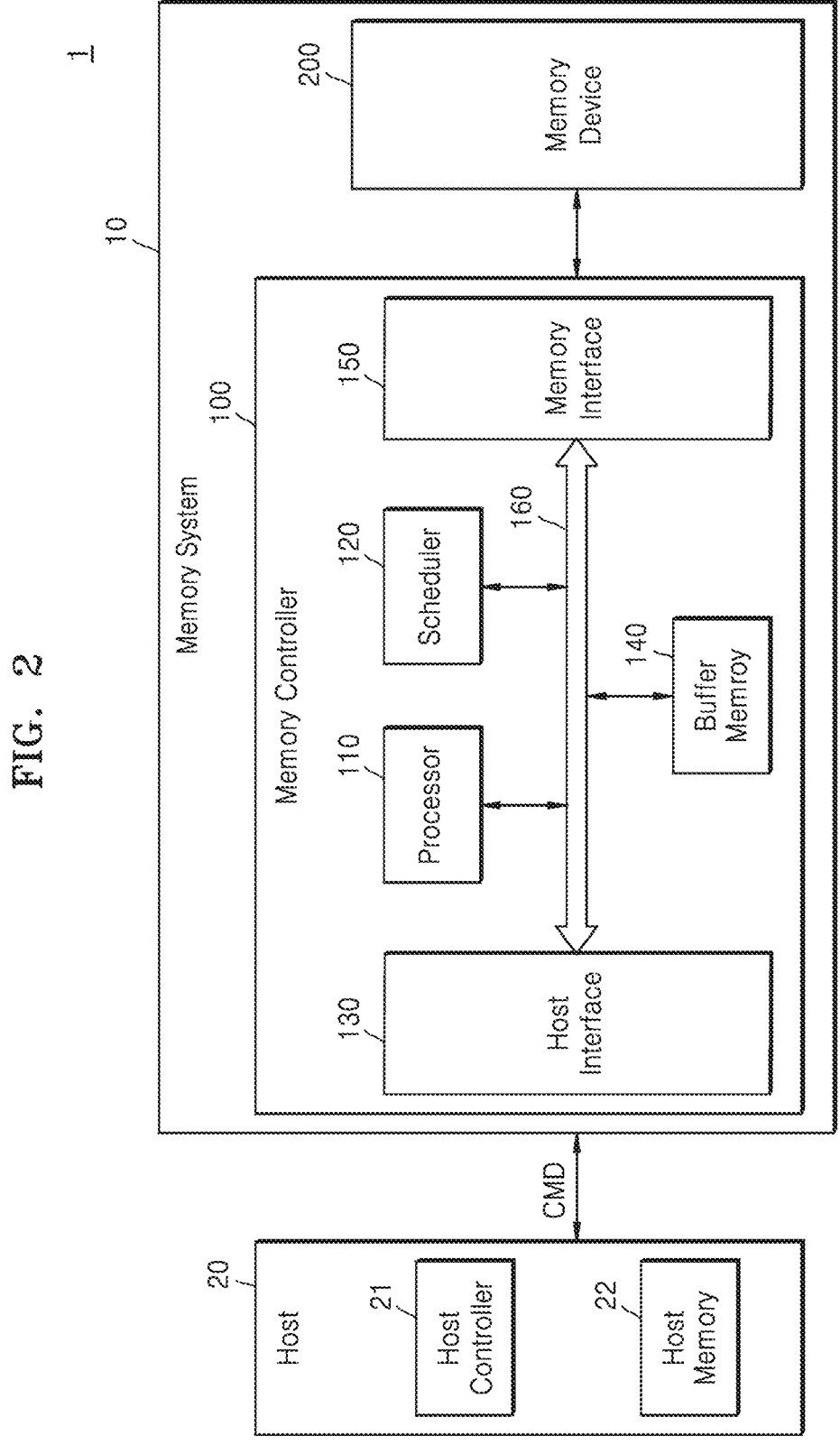
FIG. 2 is a block diagram illustrating an example of a host-storage system including a host and a storage device.

FIG. 2 is a block diagram illustrating the host-storage system 1 including the host 20 and the storage device 10. Because the storage device 10, the memory controller 100, and the memory device 200 of FIG. 2 correspond to the storage device 10, the memory controller 100, and the memory device 200 of FIG. 1, respectively, redundant descriptions thereof are omitted.

Referring to FIG. 2, the host-storage system 1 includes the storage device 10 and the host 20, and the storage device 10 may include the memory controller 100 and the memory device 200. In addition, the host 20 may include a host controller 21 and a host memory 22. The host memory 22 may function as a buffer memory for temporarily storing data to be transmitted to the storage device 10 or data transmitted from the storage device 10.

In some implementations, the host controller 21 and the host memory 22 may be implemented as separate semiconductor chips. Alternatively, in some implementations, the host controller 21 and the host memory 22 may be integrated on the same semiconductor chip. As an example, the host controller 21 may be one of multiple modules provided in an application processor, and the application processor may be implemented as a system-on-chip (SoC). In addition, the host memory 22 may be an embedded memory provided within the application processor or may be a nonvolatile memory or memory module located outside the application processor.

The memory controller 100 may include a processor 110, a scheduler 120, a host interface 130, a buffer memory 140, and a memory interface 150, which may communicate with each other through a bus 160. The processor 110 may include a CPU or microprocessor and may control the overall operation of the memory controller 100. In some implementations, the processor 110 may be implemented as a multi-core processor, for example, a dual-core processor or a quad-core processor.

The memory controller 100 may receive a command CMD provided from the host 20 and may access the memory device 200 in response to the command CMD.

The host interface 130 may transfer and receive packets to and from the host 20. The packet transmitted from the host 20 to the host interface 130 may include a command CMD or data to be written to the memory device 200, and the packet transferred from the host interface 130 to the host 20 may include a response to a command CMD or data read from the memory device 200. The host interface 130 may receive various types of commands CMD and data regarding the commands CMD.

The memory interface 150 may transfer data to be written to the memory device 200 or receive data read from the memory device 200. This memory interface 150 may be implemented to comply with standard protocols, such as Toggle or Open NAND Flash Interface (ONFI). The command CMD may be transferred to the memory device 200 through the memory interface 150. As an example, the command CMD may be transferred to the memory device 200 as a packet.

In some implementations, the memory controller 100 may further include a packet manager, an error correction code (ECC) engine, and an advanced encryption standard (AES) engine. The packet manager may generate packets according to a protocol of an interface negotiated with the host 20 or parse a variety of information from packets received from the host 20.

The ECC engine may perform an error detection and correction function on read data read from the memory device 200. In detail, the ECC engine may generate parity bits for write data to be stored in the memory device 200, and the parity bits generated in this way will be stored in the memory device 200 along with the write data. When reading data from the memory device 200, the ECC engine may correct errors in the read data using parity bits read from the memory device 200 together with the read data and may output read data with the errors corrected.

The AES engine may perform at least one of an encryption operation and a decryption operation on data input to the memory controller 100 using a symmetric-key algorithm.

The scheduler 120 may transfer the command CMD received from the host 20 to the memory device 200. The scheduler 120 may transmit the command CMD stored in the queue to the die of the memory device 200. The scheduler 120 may generate a scheduling program to transmit the command CMD to the memory device 200 and transfer the command CMD to a die corresponding to each command CMD according to the generated scheduling program.

In some implementations, the scheduler 120 may control the order in which the commands CMD are transferred to the memory device 200, based on whether there are commands CMD that occupy the same die among the commands CMD stored in the queue. The memory controller 100 may generate a scheduling program based on whether there is an overlapping die among the dies occupied by each of the commands CMD stored in the queue.

In some implementations, when there are commands CMDs that occupy the same die among the commands CMD stored in the queue, the scheduler 120 may change the order in which the commands CMD are transferred to the memory device 200 so that the commands CMD occupying the same die are in consecutive order. The scheduler 120 may transfer the commands CMD to the memory device 200 according to a scheduling program that sets the commands CMDs that occupy the overlapping die in consecutive order. When there are commands CMD that occupy the same die among the plurality of commands CMD stored in the queue but not all of the commands CMD stored in the queue are commands CMD that occupy the same dies, the scheduler 120 may generate a scheduling program so that the commands CMDs that occupy the same dies are in consecutive order.

In some implementations, the scheduler 120 may generate a scheduling program based on whether the commands CMD are stored in the queue. When the commands CMD are stored in the queue, the scheduler 120 may generate a scheduling program so that commands CMD that occupy the same die among the commands CMD stored in the queue are in consecutive order, and may transfer the commands CMD to the memory device 200 according the scheduling program. If the commands CMD are not stored in the queue, the scheduler 120 may determine to not generate a scheduling program, e.g., bypass generating a scheduling program. If the commands CMD are not stored in the queue, the scheduler 120 does not generate a scheduling program, e.g., bypasses generating a scheduling program, that considers the commands that occupy the same die.

In some implementations, the scheduler 120 may transfer at least one of the commands CMD to the memory device 200 according to a scheduling program based on a power comparison result. The power comparison result may be a comparison result of the total amount of power of the memory device 200 and a limited power amount of the memory device 200.

If the total amount of power of the memory device 200 is less than the limited power amount of the memory device 200, the scheduler 120 may transfer at least one of the commands CMD to the memory device 200 according to a scheduling program. If the total amount of power of the memory device 200 is less than the limited power amount of the memory device 200, the scheduler 120 may transfer commands that occupy the same die to the memory device 200 in consecutive order.

If the total amount of power of the memory device 200 is greater than or equal to the limited power amount of the memory device 200, the scheduler 120 may stop transferring the commands CMD to the memory device 200. The scheduler 120 may stop transferring at least one of the commands CMD stored in the queue to the memory device 200 according to the scheduling program.

The buffer memory 140 may temporarily store data to be written to the memory device 200 or data to be read from the memory device 200. The buffer memory 140 may be provided within the memory controller 100 or may be located outside the memory controller 100. For example, the memory controller 100 may further include a buffer memory manager or a buffer memory interface for communicating with the buffer memory 140.

Figure 3:
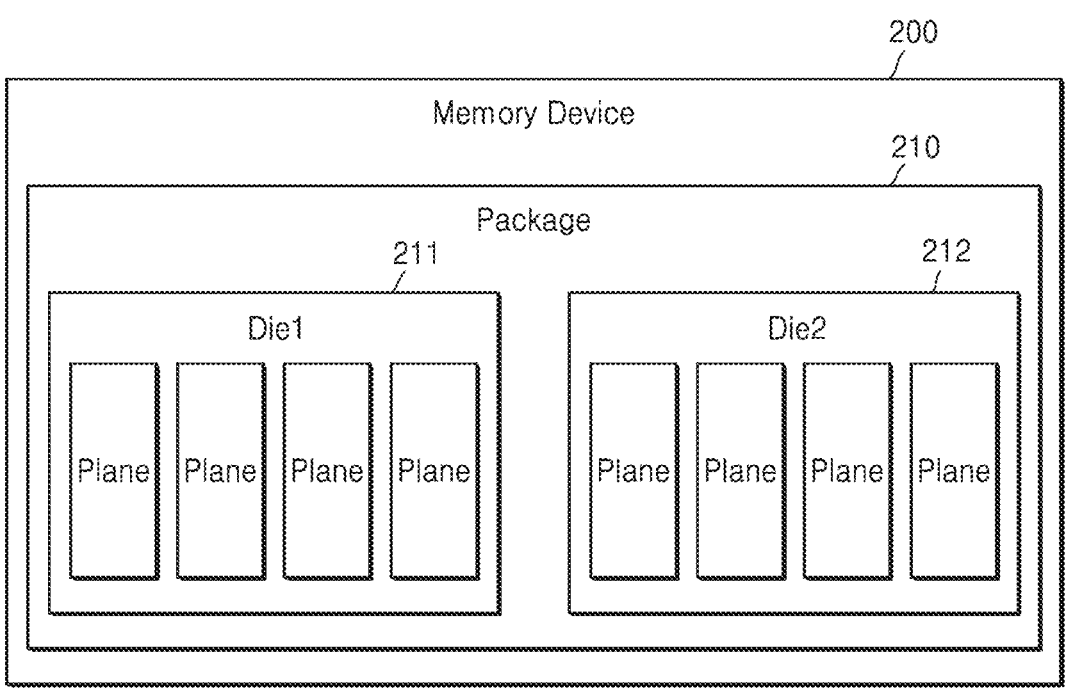
FIG. 3 is a diagram illustrating an example of a memory device.

FIG. 3 is a diagram illustrating an example of the memory device 200.

Referring to FIG. 3, the memory device 200 includes a package 210. Although the memory device 200 in FIG. 3 is shown as including one package 210, the memory device 200 is not limited thereto and the memory device 200 may include a plurality of packages.

The package 210 may include a plurality of dies. The package 210 may include a first die 211 and a second die 212. Each of the first die 211 and the second die 212 may include a plurality of planes. Although FIG. 3 shows that one package 210 includes two first die 211 and the second die 212, the package 210 is not limited thereto and the package 210 may include various numbers of dies. For example, the package 210 may include four dies.

In addition, each of the first die 211 and the second die 212 may include a various number of planes. Planes belonging to the same die (the first die 211 or the second die 212)

may simultaneously perform the same type of operation, and each of the first die 211 and the second die 212 may independently perform a NAND operation simultaneously. A command received from a host (e.g., the host 20 in FIG. 1) may include information on the first die 211 and the second die 212 occupied by respective commands. The first die 211 and the second die 212 occupied by the commands may refer to the first die 211 and the second die 212 of the memory device 200 on which the command is to perform a memory operation. For example, a die occupied by each of a first command and a second command may be the first die 211.

Figure 4:
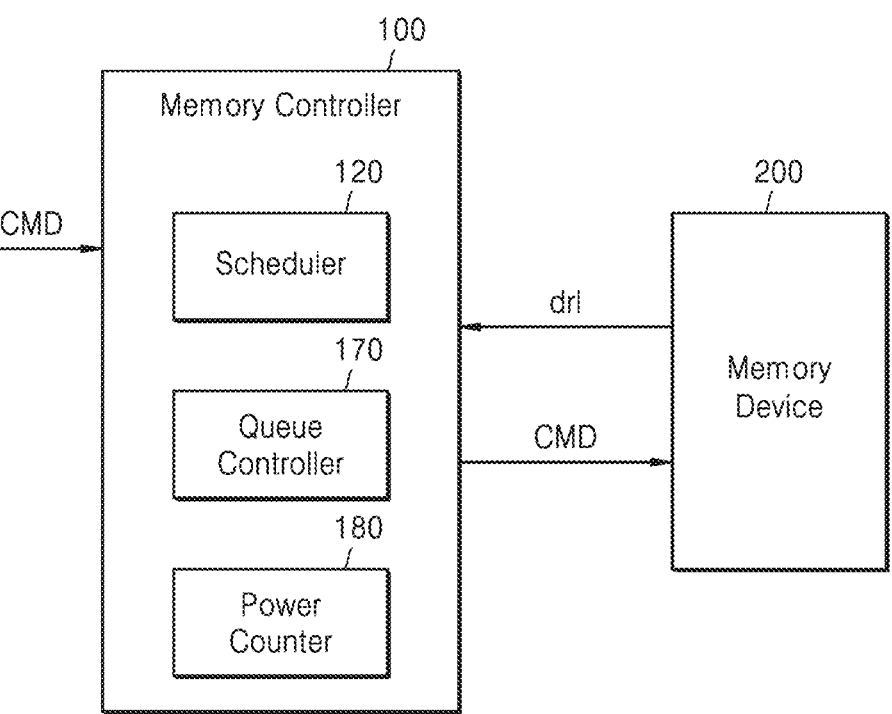
FIG. 4 is a block diagram illustrating an example of a memory controller.

FIG. 4 is a block diagram illustrating an example of the memory controller 100. Because the memory controller 100 and the scheduler 120 of FIG. 4 correspond to the memory controller 100 and the scheduler 120 of FIG. 2, respectively, redundant descriptions thereof are omitted.

Referring to FIG. 4, the memory controller 100 includes the scheduler 120, a queue controller 170, and a power counter 180. The scheduler 120 may transfer commands CMD received from a host (e.g., the host 20 of FIG. 2) to the memory device 200. The scheduler 120 may generate a scheduling program to transmit the commands CMD to the memory device 200 and transfer the commands CMD to dies respectively corresponding to the commands CMD according to the generated scheduling program.

In some implementations, the scheduler 120 may generate a scheduling program to transfer commands CMD that occupy an overlapping die among a plurality of dies that each of the commands CMD occupies in consecutive order. If there are commands CMD that occupy the same die among the commands CMD, the scheduler 120 may transfer the commands CMD that occupy the same die in consecutive order. As an example, a first command, a second command, and a third command are transferred from the host, the first command occupies a second die, the second command occupies a first die, and the third command occupies the second die. Because the first command and the third command occupy the second die, the scheduler 120 may generate a scheduling program that transfers the first command and the third command to the memory device 200 in consecutive order. The scheduler 120 may transfer the first command, third command, and second command to the memory device 200 in the listed order.

When there are commands CMD that occupy the same die among the plurality of commands CMD stored in the queue but not all of the commands CMD stored in the queue are commands CMD that occupy the same die, the scheduler 120 may generate a scheduling program so that the commands CMDs that occupy the same die are in consecutive order.

When the dies that each of the commands CMD occupies are the same, the scheduler 120 does not generate a scheduling program that considers commands that occupy the same die. As an example, the first command, the second command, and the third command are transferred from the host, and each of the first command, the second command, and the third command occupies the first die. Because the die occupied by each of the first command, the second command, and the third command is the same, the scheduler 120 does not generate a scheduling program that considers the die.

When there are no commands, among the commands CMDs, that occupy the same die, the scheduler 120 does not generate a scheduling program that considers the commands that occupy the same die. As an example, the first command, the second command, and the third command are transferred from the host, and the first command, the second command, and the third command occupy a first die, a second die, and a third die, respectively. Because the dies respectively occupied by the first command, the second command, and third command occupy are different, the scheduler 120 may determine to not generate a scheduling program that considers commands that occupy the same die. As an example, the scheduler 120 may transfer the commands CMD to the memory device 200 in an order in which the commands CMD are transferred to the memory controller 100. However, the present disclosure is not limited thereto.

In some implementations, the scheduler 120 may generate a scheduling program based on die state information drI. The scheduler 120 may receive die state information drI from a die. The die state information drI may be a signal indicating a ready state of the die included in the memory device 200 and may include state information of a plane included in the die. The scheduler 120 may receive a busy signal when the die is performing a separate operation and a ready signal when the die is not performing a separate operation. The die state information drI may include the busy signal and the ready signal.

When receiving the die state information drI of the ready signal, the scheduler 120 may generate a scheduling program that transfers the commands CMD that occupy an overlapping die among the dies respectively occupied by the commands CMD in consecutive order. As an example, the first command occupies the second die, the second command occupies the first die, the third command occupies the second die, and the scheduler 120 receives a ready signal for the second die. The scheduler 120 may generate a scheduling program that transfers the first command and the third command to the memory device 200 in consecutive order. The scheduler 120 may transfer the first command, third command, and second command to the memory device 200 in the listed order. However, the inventive concept is not limited to the above examples.

When receiving the die state information drI of a busy signal, the scheduler 120 does not generate a scheduling program that considers the same die. As an example, upon receiving the die state information drI of the busy signal, the scheduler 120 may queue the commands CMD transferred from the host. The scheduler 120 may generate a scheduling program when the ready signal is received as the die is ready.

The memory controller 100 may determine whether to store at least one command CMD received from the host in a queue. The queue controller 170 may determine whether to store the command CMD in the queue. In some implementations, the queue controller 170 may determine whether to store the command CMD in the queue based on a queue depth. The queue depth may indicate the number of commands CMD received from the host during a certain period of time. The queue controller 170 may acquire information on the queue depth based on the command CMD received from the host.

In some implementations, the queue controller 170 may store the command CMD in the queue if the queue depth for the command CMD is greater than or equal to a threshold depth. The queue depth that is greater than or equal to the threshold depth may correspond to a first queue depth. When the queue depth for the command CMD corresponds to the first queue depth, the queue controller 170 may store the command CMD in the queue.

As an example, the first queue depth may be a relatively high queue depth. That is, the queue controller 170 may queue the command CMD when the queue depth for the command CMD corresponds to the high queue depth. In some implementations, the threshold depth may be set in advance in the storage device.

In some implementations, the queue controller 170 does not store the command CMD in the queue if the queue depth for the command CMD is less than the threshold depth. A queue depth that is less than the threshold depth may correspond to a second queue depth. When the queue depth for the command CMD corresponds to the second queue depth, the queue controller 170 does not store the command CMD in the queue. As an example, the second queue depth may be a relatively low queue depth. That is, the queue controller 170 does not queue the command CMD when the queue depth for the command CMD corresponds to the low queue depth. A queuing process for the command CMD may be omitted, and the command CMD may be transferred to the memory device 200.

The power counter 180 may calculate the total amount of power of the memory device 200. The total amount of power of the memory device 200 may refer to the amount of power currently consumed by the memory device 200. The power counter 180 may calculate the total amount of power based on at least one of the type of command CMD performed by the memory device 200, the number of commands CMD, and the amount of power consumed when executing one command CMD. For example, if a memory operation corresponding to the command CMD currently performed in the memory device is added, the total amount of power currently consumed by the memory device 200 may increase. When the memory operation corresponding to the command CMD performed in the memory device is completed, the total amount of power may be reduced.

The power counter 180 may compare the total amount of power with a limited power amount and generate a power comparison result. The limited power amount may refer to the maximum amount of power that the memory device 200 may consume, while satisfying the reliability and stability of the memory device 200. The limited power amount may be a preset value. The power counter 180 may compare whether the total amount of power is greater than or equal to the limited power amount or is less than the limited power amount.

In some implementations, the scheduler 120 may generate a scheduling program based on whether the command CMD is stored in the queue. When the command CMD is stored in the queue, the scheduler 120 may generate a scheduling program by considering the same die. When the queue depth for the command CMD corresponds to the first queue depth, the scheduler 120 may generate a scheduling program based on whether there are commands that occupy the same die among the commands CMD stored in the queue.

The command CMD is stored in the queue, and when there are commands CMD that occupy the same die among the commands CMD stored in the queue, the scheduler 120 may generate a scheduling program so that the commands that occupy the same die are in consecutive order. The scheduler 120 may change the order in which the commands CMD are transferred to the memory device 200 so that the commands that occupy the same die are in consecutive order.

The scheduler 120 does not generate a scheduling program that considers commands that occupy the same die if the commands CMD are not stored in the queue. In some implementations, when the commands CMD are not stored in the queue, the scheduler 120 may directly transfer the commands CMD to the memory device 200. As an example, when the command CMD is not stored in the queue, the scheduler 120 does not change the order in which the commands CMD are transferred to the memory device 200.

In some implementations, the scheduler 120 may transfer at least one of the commands CMD to the memory device 200 according to a scheduling program based on the power comparison result. For example, the scheduler 120 may receive the power comparison result from the power counter 180 and transfer the commands CMD to the memory device 200 based on the power comparison result.

When the power comparison result indicates that the total amount of power is less than the limited power amount of the memory device 200, the scheduler 120 may transfer the commands CMD to the memory device 200 according to the generated scheduling program. If the total amount of power of the memory device 200 is less than the limited power amount, the scheduler 120 may transfer commands CMDs that occupy the same die to the memory device 200 in consecutive order.

If the power comparison result indicates that the total amount of power of the memory device 200 is greater than or equal to the limited power amount, the scheduler 120 does not transfer the commands CMD to the memory device 200 according to the generated scheduling program. For example, when the total amount of power is greater than or equal to the limited power amount, the scheduler 120 may wait until the total amount of power is less than the limited power amount and then transfer the commands CMD to the memory device 200.

In some implementations, the scheduler 120 may control the order in which the commands CMD are transferred to the memory device 200 based on the power comparison result. If the total amount of power is less than the limited power amount, the scheduler 120 may control the order in which the commands CMD are transferred based on whether there are commands CMDs that occupy the same die among the commands CMD stored in the queue.

If there are commands that occupy the same die among the commands stored in the queue, the memory controller 100 may change a command transfer order so that the commands that occupy the same die are in consecutive order, thereby improving the performance of the storage device.

Figure 5A:
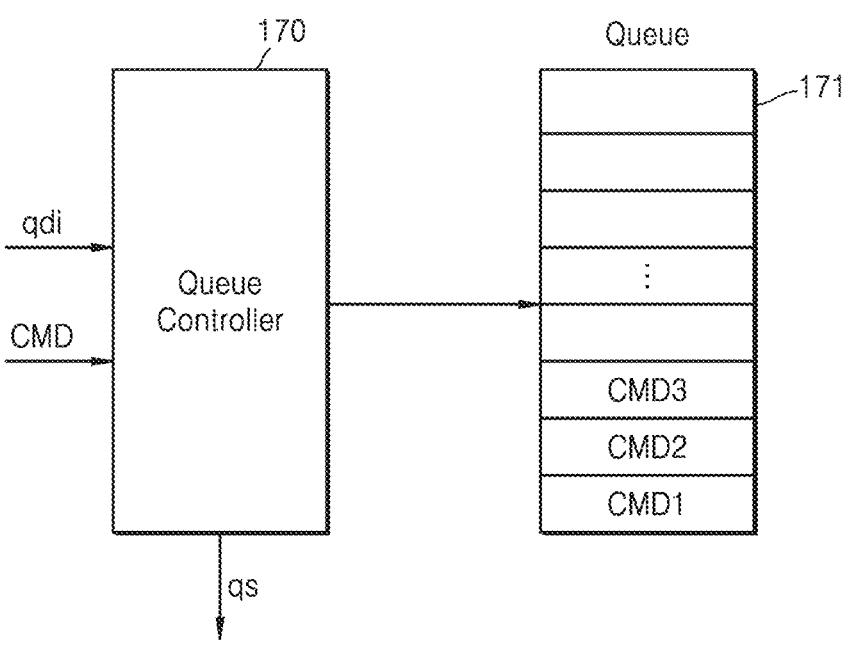
FIG. 5A is a diagram illustrating an example of a queue controller.

FIG. 5A is a diagram illustrating an example of a queue controller. In detail, FIG. 5A shows a case in which the command CMD is stored in a queue 171 and the queue depth corresponds to the first queue depth. Descriptions that are substantially the same as those given above are omitted.

The queue controller 170 may determine whether to store the commands CMD in the queue 171. In some implementations, the queue controller 170 may determine whether to store the commands CMD in the queue based on the queue depth. The queue controller 170 may receive queue depth information qdi and determine whether to store the commands CMD in the queue based on the queue depth information qdi. However, the present disclosure is not limited thereto, and the queue controller 170 may acquire information on the queue depth based on the commands CMD received from the host.

In some implementations, the queue controller 170 may store the commands CMD in the queue 171 if the queue depth for the commands CMD is greater than or equal to the threshold depth. The queue controller 170 may store commands CMD in the queue 171 when the queue depth for the command CMD corresponds to the first queue depth. The queue controller 170 may queue the commands CMD. For example, the queue controller 170 may store a first command CMD1, a second command CMD2, and a third command CMD3 in the queue 171.

As an example, when storing the commands CMD in the queue 171, the queue controller 170 may generate a queuing signal qs. The queuing signal qs may refer to a signal indicating whether the commands CMD are stored in the queue 171. The queue controller 170 may transfer the queuing signal qs to a scheduler (e.g., the scheduler 120 in FIG. 4). For example, the queue controller 170 may transfer a first level queuing signal qs to the scheduler. However, the present disclosure is not limited thereto. The scheduler may generate a scheduling program by considering commands that occupy the same die based on the queuing signal qs.

Figure 5B:
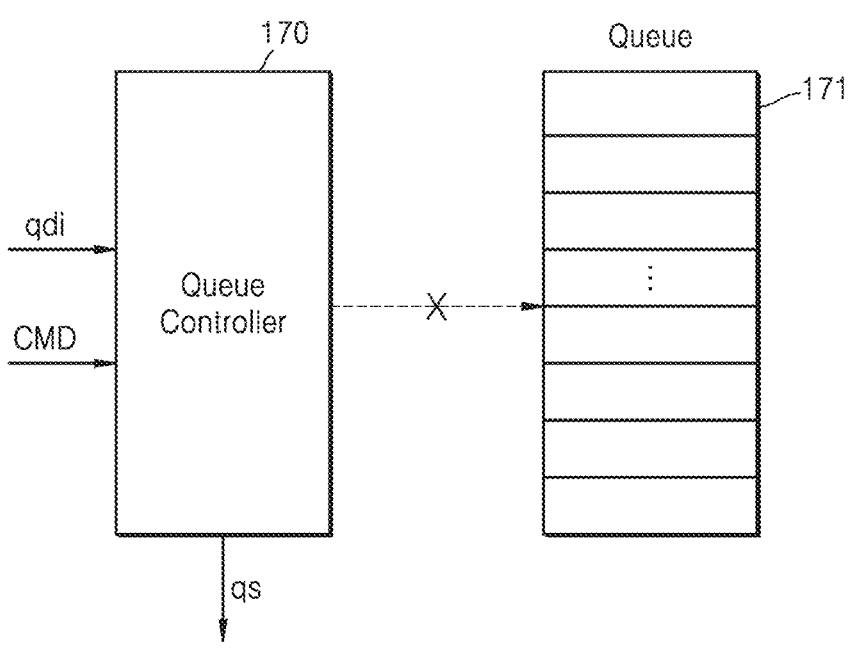
FIG. 5B is a diagram illustrating an example of a queue controller.

FIG. 5B is a diagram illustrating the queue controller 170. In detail, FIG. 5B is directed to a case in which the command CMD is not stored in the queue 171 and the queue depth corresponds to the second queue depth. Descriptions that are substantially the same as those given above are omitted.

In some implementations, the queue controller 170 does not store the command CMD in the queue 171 if the queue depth for the command CMD is less than the threshold depth. If the queue depth for the command CMD corresponds to the second queue depth, the queue controller 170 does not store the command CMD in the queue 171. A queuing process for the command CMD may be omitted, and the command CMD may be transferred to the memory device.

As an example, the queue controller 170 may generate a queuing signal qs in a case in which the command CMD is not stored in the queue 171. The queuing signal qs indicating a case in which the command CMD is not stored in the queue 171 may be at a different level from the queuing signal indicating a case in which the command CMD is stored in the queue 171. For example, the queue controller 170 may transfer a second level queuing signal qs to the scheduler. However, the present disclosure is not limited thereto. The queue controller 170 may be implemented such that the queuing signal qs is not generated in a case in which the command CMD is not stored in the queue 171.

When the queue depth corresponds to a relatively low queue depth, the command does not be stored in the queue and may be transferred to the memory device, thereby reducing a delay time when processing the command received from the host.

FIG. 6 is a diagram illustrating an example of an operation of the scheduler 120. In detail, FIG. 6 illustrates a case in which the memory controller 100 receives a read command. In addition, in FIG. 6, the command CMD is stored in the queue 171. Descriptions that are substantially the same as those given above are omitted.

Referring to FIG. 6, the memory controller 100 may receive a command CMD from the host. As an example, each command CMD may be a single plane command that occupies one plane. The command CMD may include a first read command RCMD_p18, a second read command RCMD_p23, a third read command RCMD_p41, and a fourth read command RCMD_p45. The memory controller 100 may receive the first read command RCMD_p18, the second read command RCMD_p23, the third read command RCMD_p41, and the fourth read command RCMD_p45 in the listed order.

The first read command RCMD_p18, the second read command RCMD_p23, the third read command RCMD_p41, and the fourth read command RCMD_p45 may be stored in the queue 171. Although the memory controller 100 is described as receiving four read commands, this is only for convenience of description, and the memory controller 100 may receive various numbers of commands CMD.

The memory device 200 includes the first die 211 and the second die 212. The first die 211 may include a first plane Pl1, a second plane Pl2, a third plane Pl3, and a fourth plane Pl4. The first plane Pl1 may include a 0th page, an 8th page, a 16th page, a 24th page, a 32nd page, and a 40th page. Similarly, each of the second plane Pl2, third plane Pl3, and fourth plane Pl4 may include a plurality of pages shown in FIG. 6.

The second die 212 may include a fifth plane Pl5, a sixth plane Pl6, a seventh plane Pl7, and an eighth plane Pl8. The fifth plane Pl5 may include a 4th page, a 12th page, a 20th page, a 28th page, a 36th page, and a 44th page. Similarly, each of the sixth plane Pl6, the seventh plane Pl7, and the eighth plane Pl8 may include a plurality of pages shown in FIG. 6.

The scheduler 120 may control the order in which commands CMD are transferred to the memory device 200 based on whether there are commands that occupy the same die among the commands CMD stored in the queue 171. The scheduler 120 may determine whether there are commands CMD that occupy the same die among the commands CMD stored in the queue 171.

The first read command RCMD_p18 may perform a memory operation on the 18th page, and the first read command RCMD_p18 may occupy the first die 211. The second read command RCMD_p23 may perform a memory operation on the 23rd page and may occupy the second die 212. The third read command RCMD_p41 may perform a memory operation on the 41st page and may occupy the first die 211. The fourth read command RCMD_p45 may perform a memory operation on the 45th page and may occupy the second die 212. Because the first read command RCMD_p18 and the third read command RCMD_p41 occupy the first die 211, the scheduler 120 may determine that the first and third read commands occupy the same die, and because the second read command RCMD_p23 and the fourth read command RCMD_p45 occupy the second die 212, the scheduler 120 may determine that the second and fourth read commands occupy the same die.

If there are commands CMD that occupy the same die among the commands CMD stored in the queue 171 and none of the commands CMD stored in the queue 171 occupy the same die, the scheduler 120 may change the order in which the commands CMD are transferred to the memory device 200 so that the commands CMD are in consecutive order. Because the first read command RCMD_p18 and the third read command RCMD_p41 occupy the same first die 211, the first read command RCMD_p18 and the third read command RCMD_p41 may be transferred to the memory device 200 in consecutive order.

As an example, the scheduler 120 may transfer, to the memory device 200, the first read command RCMD_p18, third read command RCMD_p41, second read command RCMD_p23, and fourth read command RCMD_p45 in the listed order. The memory controller 100 may control the command transfer order so that commands that occupy the same die are in consecutive order, so that the instantaneous rate of power consumption of the memory device may be reduced and performance of the storage device may be improved.

Figure 7:
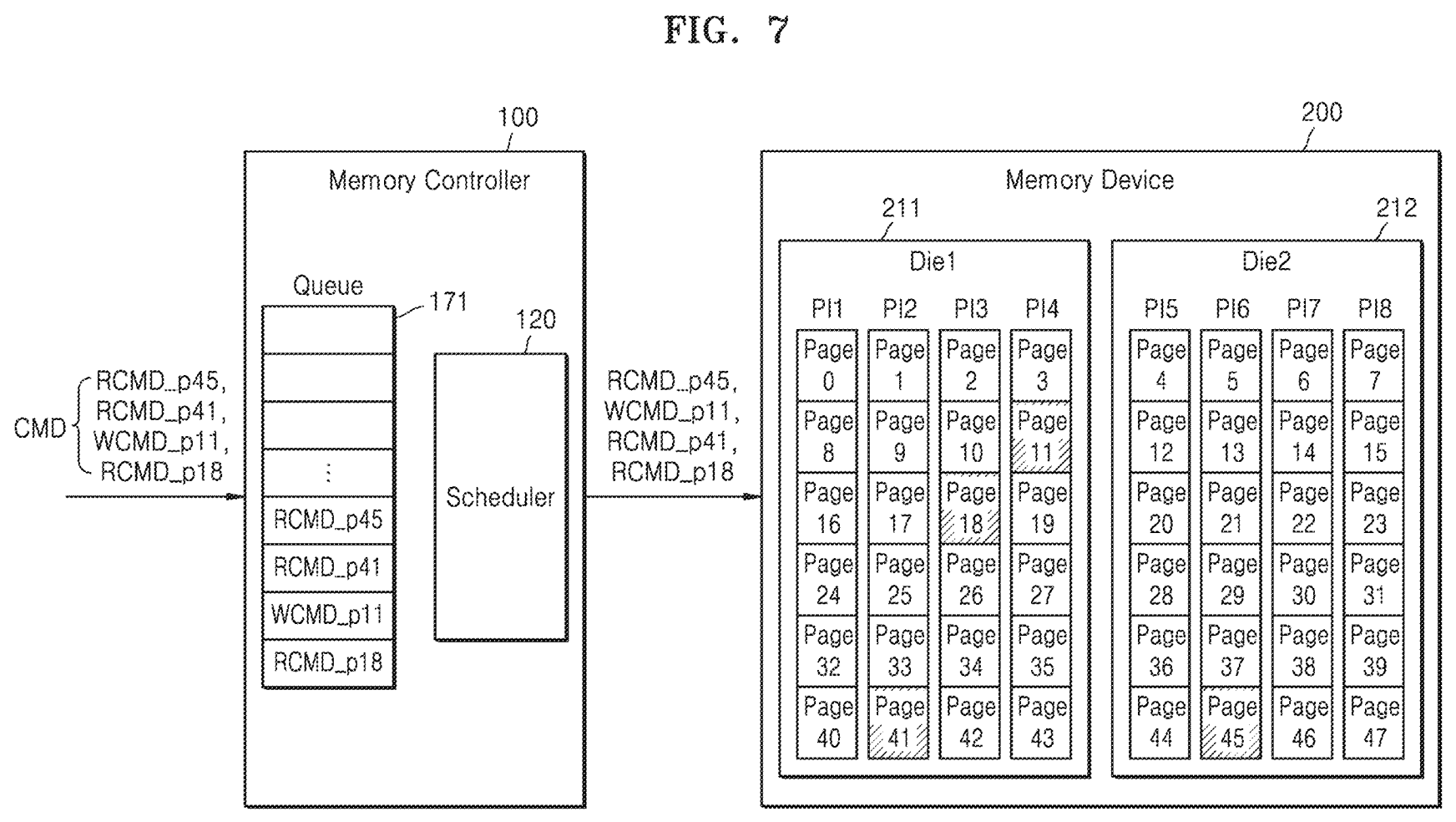

FIG. 7 is a diagram illustrating an example of an operation of the scheduler 120 according to command types. In detail, FIG. 7 illustrates a case in which the memory controller 100 receives a read command and a write command. In the example in FIG. 7, the command CMD is stored in the queue 171. Descriptions that are substantially the same as those given above with reference to FIG. 6 are omitted.

Referring to FIG. 7, the command CMD may include the first read command RCMD_p18, a second write command WCMD_p11, the third read command RCMD_p41, and the fourth read command RCMD_p45. The memory controller 100 may receive the first read command RCMD_p18, the second write command WCMD_p11, the third read command RCMD_p41, and the fourth read command RCMD_p45 in the listed order. The first read command RCMD_p18, the second write command WCMD_p11, the third read command RCMD_p41, and the fourth read command RCMD_p45 may be stored in the queue 171.

The scheduler 120 may control the order in which the commands CMD are transferred to the memory device 200 based on whether there are commands that occupy the same die among the commands CMD stored in the queue 171. The scheduler 120 may determine whether there are commands CMD that occupy the same die among the commands CMD stored in the queue 171. The scheduler 120 may determine that the first read command RCMD_p18, the second write command WCMD_p11, and the third read command RCMD_p41 occupy the first die 211.

In some implementations, the scheduler 120 may change the order in which the commands CMDs are transferred to the memory device 200 so that commands of the same command type among the commands CMD that occupy the same die are in consecutive order. The command types may include a read command, a write command, etc. The first read command RCMD_p18, the second write command WCMD_p11, and the third read command RCMD_p41 occupy the same first die 211, but the second write command WCMD_p11 is a write command, and the command type of the second write command WCMD_p11 may be different from those of the first read command RCMD_p18 and the third read command RCMD_p41.

The scheduler 120 may transfer the first read command RCMD_p18 and the third read command RCMD_p41, which have the same command type, to the memory device 200 in consecutive order. As an example, the scheduler 120 may transfer, to the memory device 200, the first read command RCMD_p18, third read command RCMD_p41, second write command WCMD_p11, and fourth read command RCMD_p45 in the listed order.

Figure 8A:
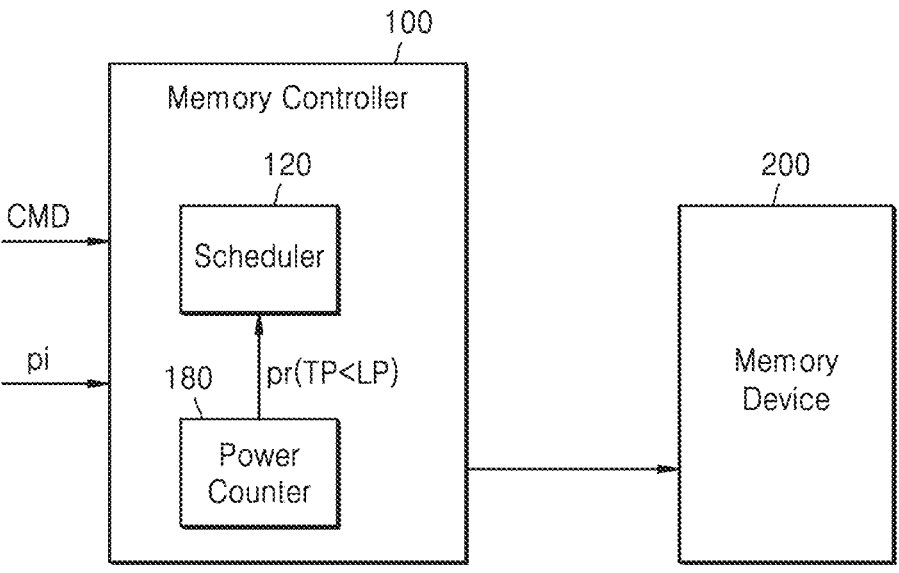
FIG. 8A is a diagram illustrating an example of a power counter.

FIG. 8A is a diagram illustrating an example of the power counter 180. Descriptions that are substantially the same as those given above are omitted.

The power counter 180 may calculate the total amount of power TP of the memory device 200. The total amount of power TP of the memory device 200 may refer to the amount of power currently consumed by the memory device 200. The power counter 180 may calculate the total amount of power TP of the memory device 200 based on power information pi. The power information pi may include the type of command CMD, the number of commands CMD, and the amount of power consumed by the memory device 200 when executing one command CMD. In some implementations, the power counter 180 may calculate the total amount of power TP of the memory device 200 based on at least one of the type of command CMD performed in the memory device 200, the number of commands CMD, and the amount of power consumed when executing one command CMD. For example, the power counter 180 may calculate the total amount of power TP of the memory device 200 by multiplying the number of commands CMD according to the types of commands CMD by the amount of power consumed when performing each command CMD.

The power counter 180 may compare the total amount of power TP with a limited power amount LP and generate a power comparison result pr. The limited power amount LP may refer to the maximum amount of power that the memory device 200 may consume, while satisfying the reliability and stability of the memory device 200. The limited power amount LP may be a preset value. The power counter 180 may compare whether the total amount of power TP is greater than or equal to the limited power amount LP or whether the total amount of power is less than the limited power amount LP.

The power counter 180 may transfer the power comparison result pr to the scheduler 120. When the total amount of power TP is less than the limited power amount LP, the power comparison result pr may include a signal indicating the corresponding fact. For example, the power comparison result pr may include a first signal. When the total amount of power TP is greater than or equal to the limit power amount LP, the power comparison result pr may include a signal indicating the corresponding fact. For example, the power comparison result pr may include a second signal.

The scheduler 120 may transfer the command CMD to the memory device 200 based on the total amount of power TP. The scheduler 120 may transfer at least one of the commands CMD to the memory device 200 according to a scheduling program based on the power comparison result pr. In some implementations, when the power comparison result pr indicates that the total amount of power TP of the memory device 200 is less than the limited power amount LP, the scheduler 120 may transfer the command CMD to the memory device 200 according to a scheduling program generated by considering commands that occupy the same die. If the total amount of power TP of the memory device 200 is less than the limited power amount LP, the scheduler 120 may transfer the commands CMDs that occupy the same die to the memory device 200 in consecutive order.

As an example, even if the scheduler 120 fails to generate a scheduling program considering the commands that occupy the same die, the scheduler 120 does not follow the scheduling program based on the power comparison result pr and transfer the commands CMD to the memory device 200.

In some implementations, the scheduler 120 may control the order in which the commands CMD are transferred to the memory device 200 based on the power comparison result pr. If the total amount of power TP is less than the limited power amount LP, the scheduler 120 may generate a scheduling program by considering commands that occupy the same die.

When the command CMD is transferred to the memory device 200, the total amount of power TP of the memory device 200 may increase. When the memory operation for each command CMD performed in the memory device 200 is completed, the total amount of power TP of the memory device may be reduced.

Figure 8B:
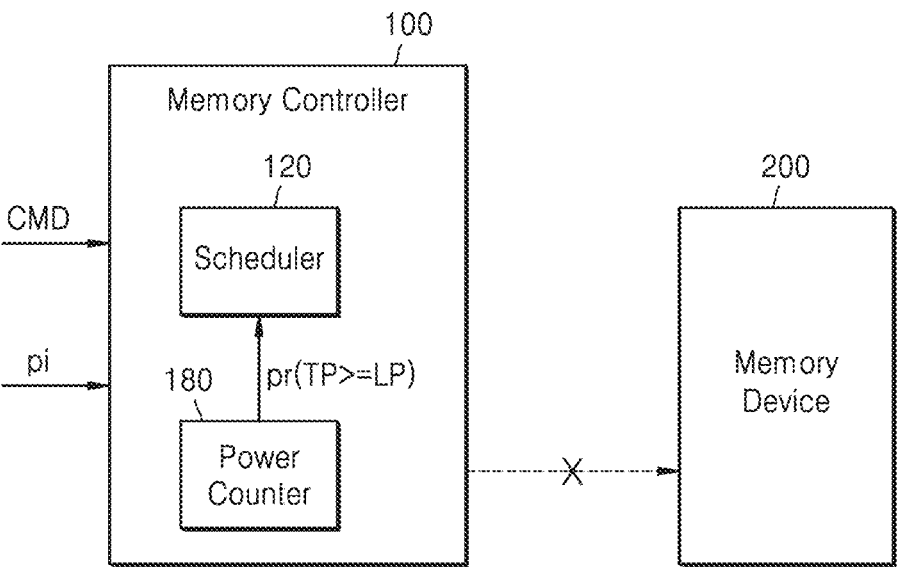
FIG. 8B is a diagram illustrating an example of a power counter.

FIG. 8B is a diagram illustrating the power counter 180. FIG. 8B illustrates a case in which the command CMD is not transferred to the memory device 200. Descriptions that are substantially the same as those given above with reference to FIG. 8A are omitted.

The scheduler 120 may transfer the command CMD to the memory device 200 based on the total amount of power TP of the memory device 200. In some implementations, when the power comparison result pr indicates that the total amount of power TP of the memory device 200 is greater than or equal to the limited power amount LP of the memory device 200, the scheduler 120 may stop transferring the commands CMD to the memory device 200 according to a scheduling program generated by considering commands that occupy the same die. For example, when the total amount of power TP of the memory device 200 is greater than or equal to the limited power amount LP, the scheduler 120 may wait until the total amount of power TP is less than the limited power amount LP and then transfer the commands CMD to the memory device 200.

In some implementations, the scheduler 120 may control the order in which the commands CMD are transferred to the memory device 200 based on the power comparison result pr. When the total amount of power TP is greater than or equal to the limited power amount LP, the scheduler 120 does not control the order in which the commands are transferred based on whether there are commands CMD that occupy the same die among the commands CMD stored in the queue. That is, when the total amount of power TP is greater than or equal to the limited power amount LP, the scheduler 120 does not generate a scheduling program that considers commands that occupy the same die.

Figure 9:
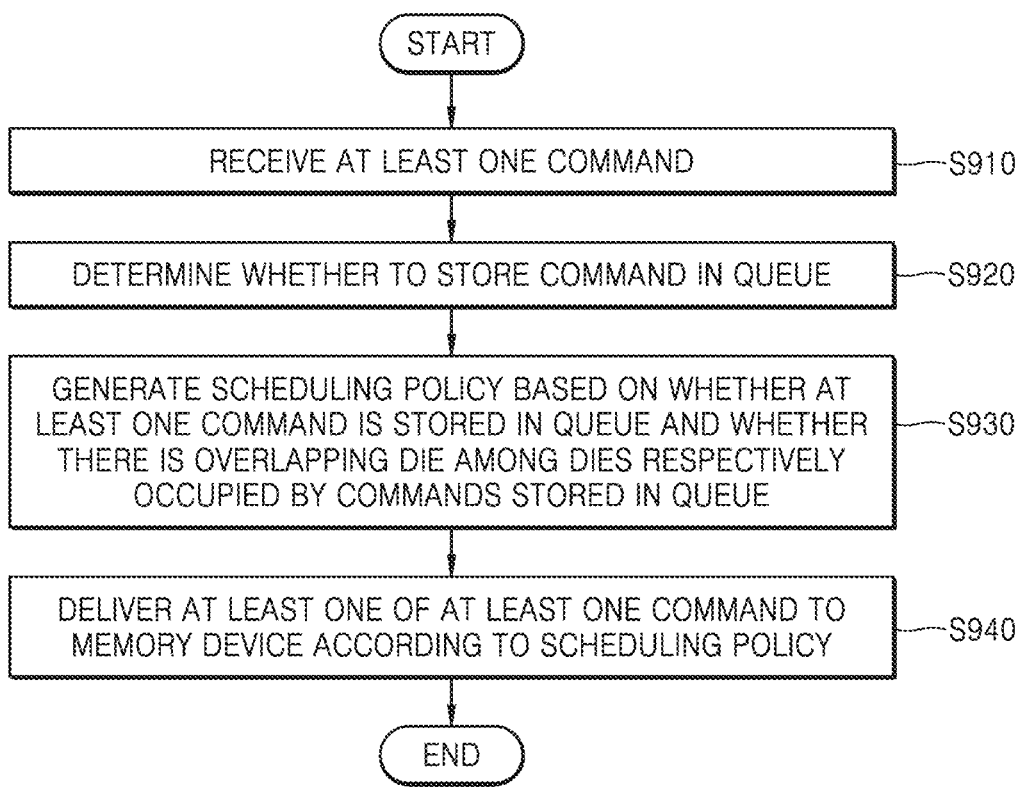
FIG. 9 is a flowchart illustrating an example of an operating method of a memory controller.

FIG. 9 is a flowchart illustrating an example of an operating method of a memory controller. Descriptions that are substantially the same as those given above are omitted.

In operation S910, the memory controller may receive at least one command. The memory controller may receive commands from the host.

In operation S920, the memory controller may determine whether to store the commands in a queue. In some implementations, the memory controller may determine whether to store the commands in the queue based on a queue depth. The queue depth may indicate the number of commands received from the host during a certain period of time.

In operation S930, the memory controller may generate a scheduling program based on whether a plurality of commands are stored in the queue and whether there is an overlapping die among a plurality of dies respectively occupied by the commands stored in the queue. When the commands are stored in the queue, the memory controller may generate a scheduling program based on whether there is an overlapping die among the dies respectively occupied by the commands stored in the queue.

In some implementations, the memory controller may control the order in which commands are transferred to the memory device based on whether there are commands that occupy the same die among the commands stored in the queue. The memory controller may generate a scheduling program based on whether there is an overlapping die among the dies respectively occupied by the commands stored in the queue. Controlling the order may include changing the order and not changing the order.

In some implementations, if there are commands that occupy the same die among the plurality of commands stored in the queue, the memory controller may change the order in which commands are transferred to the memory device so that the commands that occupy the same die are in consecutive order. If there are commands that occupy the same die among the plurality of commands stored in the queue but not all of the commands stored in the queue are commands that occupy the same die, the memory controller may generate a scheduling program so that the commands that occupy the same die are in consecutive order.

In operation S940, the memory controller may transfer at least one of the at least one command to the memory device according to the scheduling program. The memory controller may transfer commands to the memory device according to the scheduling program that sets the commands that occupy the overlapping die in consecutive order.

In some implementations, the memory controller may transfer at least one of the commands to the memory device according to the scheduling program based on the power comparison result. The power comparison result may be a result of comparison between the total amount of power of the memory device and the limited power amount of the memory device.

Figure 10:
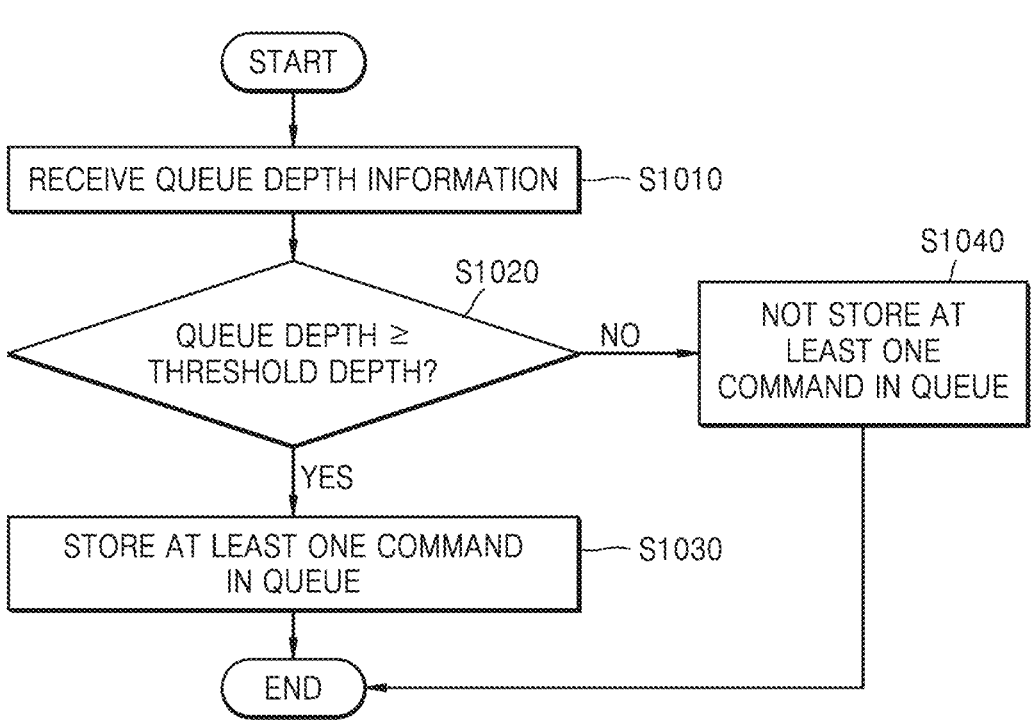
FIG. 10 is a flowchart illustrating an example of a method for a memory controller to determine whether to store a command in a queue.

FIG. 10 is a flowchart illustrating an example of a method for a memory controller to determine whether to store a command in a queue. The operations of FIG. 10 may be included in operation S920 of FIG. 9. In detail, FIG. 10 is a flowchart illustrating the operating method of the queue controller 170 of FIG. 4.

In operation S1010, the memory controller may receive queue depth information. The memory controller may determine whether to store the command in the queue based on queue depth information. A queue depth may indicate the number of commands received from the host during a certain period of time. The memory controller may acquire the queue depth information based on a command received from the host.

In operation S1020, the memory controller may determine whether the queue depth is greater than or equal to a threshold depth. The memory controller may perform operation S1030 if the queue depth is greater than or equal to the threshold depth, and may perform operation S1040 if the queue depth is less than the threshold depth. In some implementations, the threshold depth may be set in advance in the storage device.

In operation S1030, the memory controller may store the command in the queue if the queue depth for the command is equal to or greater than the threshold depth. Once the command is stored in the queue, the memory controller may generate a scheduling program by considering commands that occupy the same die.

In operation S1040, the memory controller does not store the command in the queue if the queue depth for the command is less than the threshold depth. A queuing process for the command may be omitted, and the command may be transferred to the memory device.

Figure 11:
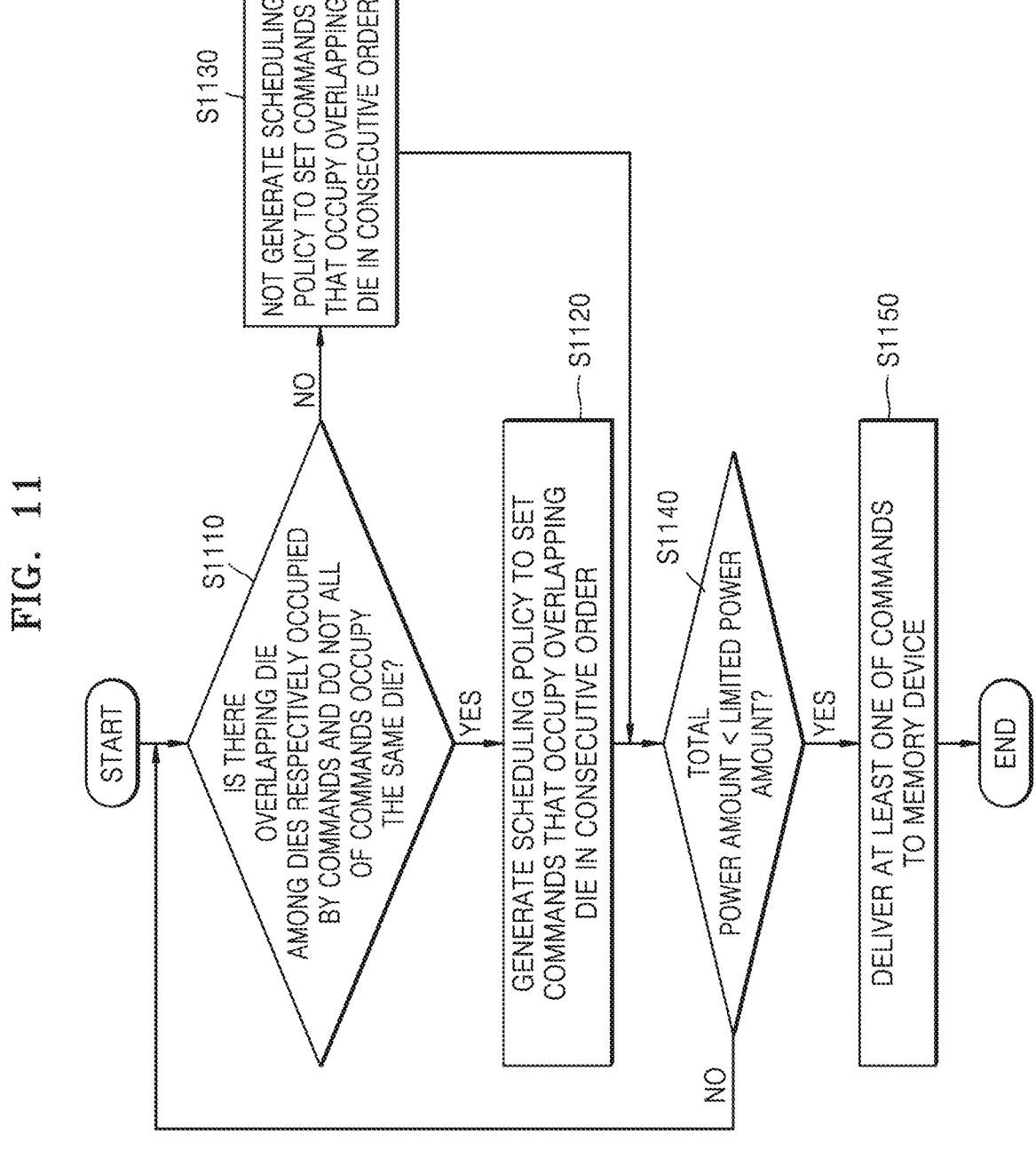
FIG. 11 is a flowchart illustrating an example of a method for a memory controller to generate a scheduling program.

FIG. 11 is a flowchart illustrating an example of a method for a memory controller to generate a scheduling program. In detail, the operations in FIG. 11 represent operations S930 and S940 in FIG. 9. In FIG. 11, a command is stored in a queue. The memory controller may receive die state information in a ready state.

In operation S1110, the memory controller may determine whether there is an overlapping die among the dies respectively occupied by the commands stored in the queue, and whether or not all of the commands occupy the same die. For example, a first read command, a second read command, and a third read command are stored in the queue, the first read command occupies the first die, the second read command occupies the second die, and the third read command occupies the first die. The first die may correspond to a die overlappingly occupied by the first read command and the third read command. The memory controller may perform operation S1120 if there is an overlapping die among the dies respectively occupied by the commands stored in the queue, and may perform operation S1130 if there is no overlapping die.

In operation S1120, if there are commands that occupy the same die among the commands stored in the queue but not all of the commands stored in the queue are commands that occupy the same die, the memory controller may generate a scheduling program so that the commands that occupy the same die are in consecutive order. If all commands stored in the queue do not occupy the same die, the memory controller may generate a scheduling program that sets commands that occupy overlapping dies in consecutive order. For example, because the first read command and the third read command occupy the first die, the memory controller may generate a scheduling program that sets the first read command and the third read command in consecutive order.

In operation S1130, the memory controller does not generate a scheduling program that sets commands that occupy overlapping dies in consecutive order.

In operation S1140, the memory controller may determine whether the total amount of power is less than the limited power amount. The total amount of power of the memory device may refer to the amount of power currently consumed by the memory device. The limited power amount may refer to the maximum amount of power that the memory device may consume, while satisfying the reliability and stability of the memory device. The limited power amount may be a preset value. The memory controller may calculate the total amount of power of the memory device based on power information.

In operation S1150, the memory controller may transfer the commands to the memory device when the total amount of power of the memory device is less than the limited power amount. When operation S1120 is performed, the memory controller may transfer the commands to the memory device according to a scheduling program that sets commands that occupy an overlapping die in consecutive order if the total amount of power of the memory device is less than the limited power amount. That is, if the total amount of power of the memory device is less than the limited power amount, the memory controller may transfer the commands to the memory device according to the scheduling program generated in operation S1120.

If the total amount of power of the memory device is less than the limited power amount, the memory controller may transfer the commands that occupy the overlapping die to the memory device in consecutive order. As an example, because the first read command and the third read command occupy the first die, the memory controller may transfer the first command, the third command, and the second command to the memory device in the listed order.

When operation S1130 is performed, because the memory controller did not generate a scheduling program that sets commands that occupy the overlapping die in consecutive order, and thus, if the total amount of power of the memory device is less than the limited power amount, the memory controller may transfer the commands to the memory device without following the scheduling program. For example, the memory controller may transfer the commands to the memory device in the order in which the commands have been received from the host.

If the total amount of power of the memory device is greater than or equal to the limited power amount, the memory controller may perform operation S1110 again. The memory controller may regenerate the scheduling program if the total amount of power of the memory device is greater than or equal to the limited power amount.

Figure 12:
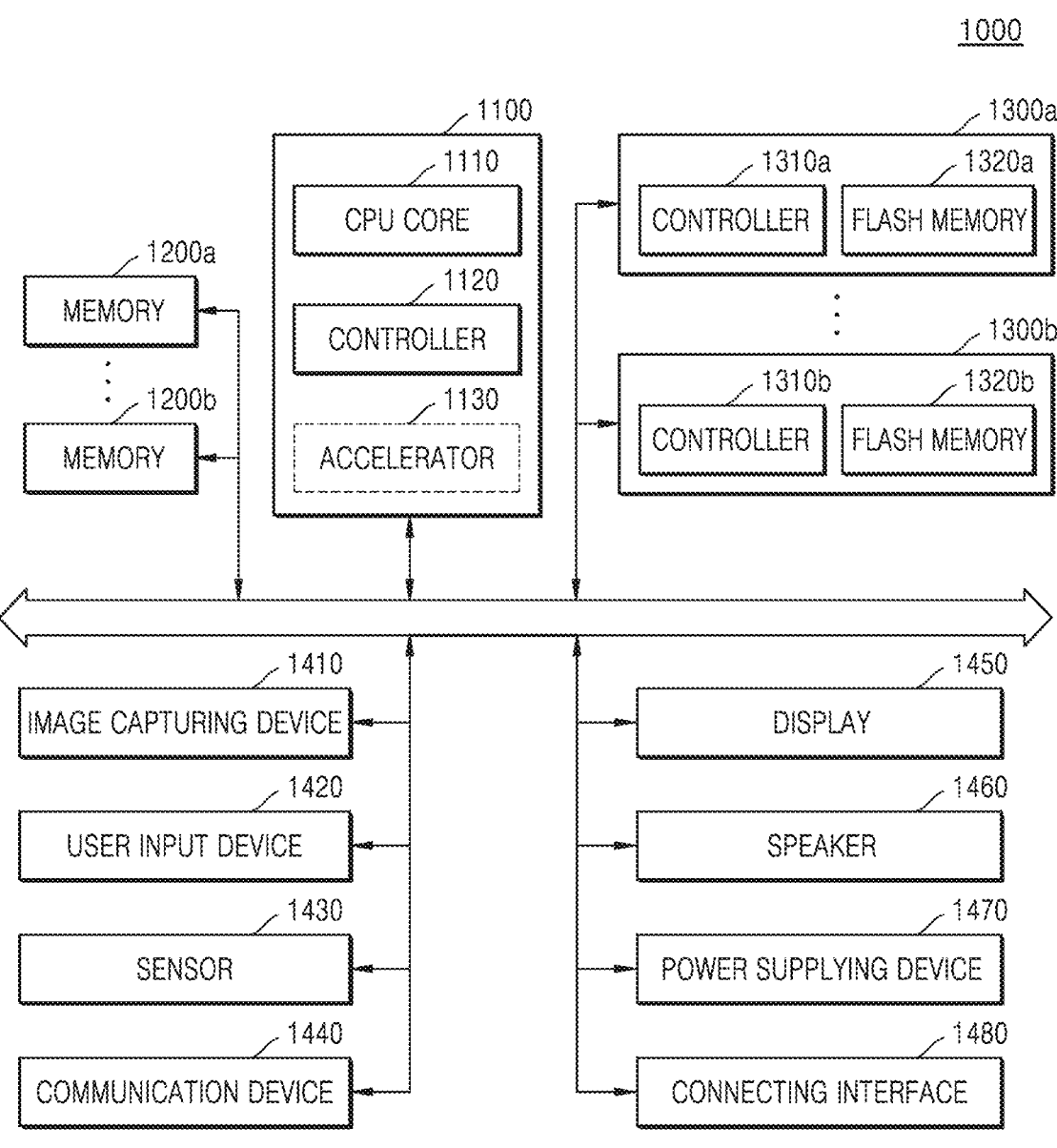
FIG. 12 shows an example of a system utilizing a storage device.

FIG. 12 shows an example of a system 1000 utilizing a storage device. The system 1000 of FIG. 12 may be a mobile system, such as a mobile phone, a smartphone, a tablet personal computer, a wearable device, a healthcare device, or Internet of things (IoT) device. However, the system 1000 of FIG. 12 is not limited to a mobile system, but may include personal computers, laptop computers, servers, media players, or automotive devices, such as navigation devices.

Referring to FIG. 12, the system 1000 includes a main processor 1100, memories 1200a and 1200b, and storage devices 1300a and 1300b, and may additionally include one or more of an image capturing device. 1410, a user input device 1420, a sensor 1430, a communication device 1440, a display 1450, a speaker 1460, a power supply device 1470, and a connection interface 1480.

The main processor 1100 may control the overall operation of the system 1000, and in detail, the operations of other components forming the system 1000. This main processor 1100 may be implemented as a general-purpose processor, a dedicated processor, or an application processor.

The main processor 1100 may include one or more CPU cores 1110 and may further include a controller 1120 for controlling the memories 1200a and 1200b and/or storage devices 1300a and 1300b. In some implementations, the main processor 1100 may further include an accelerator 1130, which is a dedicated circuit for high-speed data computation, such as artificial intelligence (AI) data computation. The accelerator 1130 may include a graphics processing unit (GPU), a neural processing unit (NPU), and/or a data processing unit (DPU), and may also be implemented as a separate chip physically independent from other components of the main processor 1100.

The memories 1200a and 1200b may be used as main memory devices of the system 1000 and may include volatile memory, such as SRAM and/or DRAM, but may also include nonvolatile memory, such as flash memory, PRAM and/or resistive random access memory (RRAM). The memories 1200a and 1200b may also be implemented in the same package as the main processor 1100.

The storage devices 1300a and 1300b may function as nonvolatile storage devices that store data regardless of whether power is supplied, and may have a relatively large storage capacity compared to the memories 1200a and 1200b. The storage devices 1300a and 1300b may include storage controllers 1310a and 1310b and nonvolatile memories (NVM) 1320a and 1320b that store data under control by the storage controllers 1310a and 1310b. The nonvolatile memories 1320a and 1320b may include flash memory having a 2-dimensional (2D) structure or a 3-dimensional (3D) vertical NAND (V-NAND) structure, but may also include other types nonvolatile memories, such as PRAM and/or RRAM. The storage device described above with reference to FIGS. 1 to 11 (e.g., the storage device 10 in FIG. 1) may be applied to the storage devices 1300a and 1300b in FIG. 12.

The storage devices 1300a and 1300b may be included in the system 1000 in a state of being physically separated from the main processor 1100 or may be implemented in the same package as the main processor 1100. In addition, the storage devices 1300a and 1300b may have a form, such as a solid state device (SSD) or a memory card, and may be detachably coupled to other components of the system 1000 through an interface, such as a connection interface 1480 to be described below. Such storage devices 1300a and 1300b may be devices to which standard protocols, such as UFS, eMMC, or NVMe are applied, but are not limited thereto.

The image capturing device 1410 may capture still images or moving images, and may be a camera, camcorder, and/or webcam. The user input device 1420 may receive various types of data input from a user of the system 1000, and may include a touch pad, a keypad, a keyboard, a mouse and/or a microphone, etc. The sensor 1430 may detect various types of physical quantities that may be acquired from outside the system 1000 and convert the sensed physical quantities into electrical signals. The sensor 1430 may include a temperature sensor, a pressure sensor, an illumination sensor, a position sensor, an acceleration sensor, a biosensor, and/or a gyroscope sensor.

The communication device 1440 may transfer and receive signals to and from other devices outside the system 1000 according to various communication protocols. The communication device 1440 may be implemented to include an antenna, a transceiver, and/or a modem. The display 1450 and the speaker 1460 may function as output devices that output visual information and auditory information, respectively, to the user of the system 1000. The power supply device 1470 may appropriately convert power supplied from a battery (not shown) built into the system 1000 and/or an external power source and supply the power to each component of the system 1000.

The connection interface 1480 may provide a connection between the system 1000 and an external device that is connected to the system 1000 and may exchange data with the system 1000. The connection interface 1480 may be implemented through various interface methods, such as an advanced technology (ATA) device. Attachment), serial ATA (SATA), external SATA (e-SATA), SCSI, serial attached SCSI (SAS), PCI, PCI express (PCIe), NVMe, IEEE 1394, USB, SD card, MMC, eMMC, UFS, embedded universal flash storage (eUFS), CF card interface, etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the inventive concept has been particularly shown and described with reference to embodiments thereof, it will be understood that various changes in form and details may be made therein without departing from the spirit and scope of the following claims.

What is claimed is:

1. A storage device that communicates with a host, the storage device comprising:

a memory device including a plurality of dies; and a memory controller configured to receive at least one command from the host and transfer the at least one command to the memory device, wherein the memory controller is configured to store commands received from the host in a queue, and wherein, based on a first set of commands, among the commands stored in the queue, that occupy the same die, the memory controller is configured to change an order in which the commands stored in the queue are transferred to the memory device so that the first set of commands that occupy the same die are transferred one after another in consecutive order.

2. The storage device of claim 1, wherein the memory controller is configured to change the order so that commands of a same command type among the first set of commands that occupy the same die are transferred one immediately after another in consecutive order.

3. The storage device of claim 1, wherein the memory controller is configured to determine whether to store the at least one command received from the host in the queue based on a queue depth.

4. The storage device of claim 3, wherein, in response to the queue depth for the at least one command corresponding to a first queue depth, the memory controller is configured to store the commands in the queue and to change the order of the commands stored in the queue.

5. The storage device of claim 4, wherein, in response to the queue depth for the at least one command corresponding to a second queue depth less than the first queue depth, the memory controller is configured to directly transfer the at least one command to the memory device.

6. The storage device of claim 1, wherein the memory controller is configured to calculate a total amount of power of the memory device and to transfer the commands stored in the queue to the memory device in the changed order based on the total amount of power of the memory device.

7. The storage device of claim 6, wherein, in response to the total amount of power of the memory device being less than a limited power amount of the memory device, the memory controller is configured to transfer at least one of the commands stored in the queue to the memory device according to the changed order.

8. The storage device of claim 1, wherein the memory controller is configured to compare a total amount of power of the memory device with a limited power amount of the memory device and to change the order in response to there being commands that occupy the same die among the commands stored in the queue according to a comparison result.

9. The storage device of claim 1, wherein the memory controller is configured to receive die state information from the memory device and to change the order based on the die state information.

10. A memory controller comprising:

a queue controller circuit configured to determine whether to store a command received from a host in a queue based on a queue depth;

a scheduler circuit configured to generate a scheduling program for providing commands to a memory device including a plurality of dies, based on whether there is an overlapping die among the plurality of dies respectively occupied by the commands stored in the queue and whether the commands are stored in the queue; and a power counter circuit configured to compare a total amount of power of the memory device with a limited power amount of the memory device and generate a power comparison result, wherein the scheduler circuit is configured to transfer at least one of the commands to the memory device according to the scheduling program based on the power comparison result, and wherein the scheduling program is configured to set the commands that occupy the overlapping die in consecutive order for being transferred one after another in response to the commands being provided to the memory device.

11. The memory controller of claim 10, wherein the queue controller circuit is configured to store the command received from the host in the queue in response to the queue depth for the command received from the host being greater than or equal to a threshold depth, and wherein the scheduler circuit is configured to generate the scheduling program based on whether there is an overlapping die.

12. The memory controller of claim 10, wherein the queue controller circuit is configured to bypass storing the command received from the host in the queue in response to the queue depth for the command received from the host being less than a threshold depth.

13. The memory controller of claim 10, wherein the power counter circuit calculates the total amount of power based on a type of command performed by the memory device and a number of commands performed by the memory device.

14. The memory controller of claim 10, wherein the scheduler circuit transfers at least one of the commands stored in the queue according to the scheduling program based on the power comparison result being that the total amount of power is less than the limited power amount.

15. The memory controller of claim 10, wherein, in response to the power comparison result being that the total amount of power is greater than or equal to the limited power amount, the scheduler circuit is configured to stop transferring at least one of the commands stored in the queue to the memory device according to the scheduling program.

16. The memory controller of claim 10, wherein, in response to the power comparison result being that the total amount of power is greater than or equal to the limited power amount, the scheduler circuit is configured to re-generate the scheduling program.

17. An operating method of a memory controller, the operating method comprising:

receiving at least one command from a host;

determining whether to store the at least one command in a queue;

generating a scheduling program for providing commands to a memory device, based on whether the commands are stored in the queue and whether there is an overlapping die among a plurality of dies respectively occupied by the commands stored in the queue, wherein the scheduling program is configured to set the commands that occupy the overlapping die in consecutive order for being transferred one after another in response to the commands being provided to the memory device; and transferring at least one of the commands to the memory device according to the scheduling program.

* * * * *